(12) United States Patent
Kobayashi et al.

(10) Patent No.: US 7,227,339 B2
(45) Date of Patent: Jun. 5, 2007

(54) POWER GENERATION CONTROLLER OF VEHICLE POWER GENERATOR

(75) Inventors: Masaru Kobayashi, Tokyo (JP); Kiyoharu Anzai, Tokyo (JP); Hiroaki Morimoto, Osaka (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 153 days.

(21) Appl. No.: 11/092,720

(22) Filed: Mar. 30, 2005

(65) Prior Publication Data

US 2005/0218815 A1  Oct. 6, 2005

(30) Foreign Application Priority Data

Mar. 30, 2004 (JP) .......................... P2004-100565

(51) Int. Cl.
H02H 7/06 (2006.01)
H02P 9/00 (2006.01)
H02P 11/00 (2006.01)
H02P 6/02 (2006.01)
H02K 1/22 (2006.01)

(52) U.S. Cl. .................. 322/24; 310/263; 318/254
(58) Field of Classification Search .............. 322/24; 310/263; 318/254

See application file for complete search history.

(56) References Cited

U.S. PATENT DOCUMENTS

| | | | | |
|---|---|---|---|---|
| 5,486,743 A * | 1/1996 | Nagai | .......................... | 318/439 |
| 5,536,987 A * | 7/1996 | Hayashi et al. | .............. | 310/263 |
| 5,694,010 A * | 12/1997 | Oomura et al. | .............. | 318/254 |
| 5,723,967 A * | 3/1998 | Hongo et al. | ............... | 318/254 |
| 5,739,650 A * | 4/1998 | Kimura et al. | .............. | 318/254 |
| 5,825,642 A * | 10/1998 | Ishii et al. | ................... | 363/141 |
| 5,834,911 A * | 11/1998 | Kimura | ....................... | 318/254 |
| 5,955,809 A * | 9/1999 | Shah | ........................... | 310/198 |
| 6,008,600 A * | 12/1999 | Tomioka | ..................... | 318/254 |
| 6,169,378 B1 * | 1/2001 | Karwath | ..................... | 318/254 |
| 6,586,898 B2 * | 7/2003 | King et al. | .................. | 318/254 |
| 6,605,912 B1 * | 8/2003 | Bharadwaj et al. | ......... | 318/439 |
| 6,922,029 B2 * | 7/2005 | Fuse | ........................... | 318/254 |
| 6,984,953 B2 * | 1/2006 | Quirion et al. | ............. | 318/599 |
| 7,034,497 B2 * | 4/2006 | Markunas et al. | .......... | 318/712 |
| 7,042,180 B2 * | 5/2006 | Terry et al. | ................. | 318/434 |
| 7,105,944 B2 * | 9/2006 | Wakitani et al. | ........... | 307/10.6 |

(Continued)

FOREIGN PATENT DOCUMENTS

JP      07-075262 A     3/1995

(Continued)

*Primary Examiner*—Darren Schuberg
*Assistant Examiner*—Pedro J. Cuevas
(74) *Attorney, Agent, or Firm*—Sughrue Mion, PLLC

(57) ABSTRACT

The present invention relates to a power generation controller of a vehicle power generator, which includes: voltage detection means for sampling a voltage of a battery based on a reference clock signal; duty range setting means for setting a range for an ON/OFF ratio of a field switching element from the rotation speed of the power generator; control duty computation means for computing the ON/OFF ratio of the field switching element based on thus set duty range from a deviation between a power generation target voltage and voltage information as a result of sampling; and field PWM drive means for controlling the ON/OFF switching operation of the field switching element with an interval based on the reference clock signal from the computed ON/OFF ratio.

7 Claims, 8 Drawing Sheets

U.S. PATENT DOCUMENTS

| | | | |
|---|---|---|---|
| 7,138,777 B2 * | 11/2006 | Won et al. | 318/254 |
| 7,141,943 B2 * | 11/2006 | Song et al. | 318/254 |
| 7,173,393 B2 * | 2/2007 | Maeda et al. | 318/801 |
| 2004/0183488 A1 * | 9/2004 | Fuse | 318/254 |
| 2004/0251860 A1 * | 12/2004 | Ehsani et al. | 318/254 |
| 2005/0007044 A1 * | 1/2005 | Qiu et al. | 318/254 |
| 2005/0237033 A1 * | 10/2005 | Shirakawa et al. | 322/28 |
| 2006/0113861 A1 * | 6/2006 | Mukai et al. | 310/263 |
| 2006/0145639 A1 * | 7/2006 | Song et al. | 318/254 |
| 2007/0013262 A1 * | 1/2007 | Okumoto et al. | 310/263 |

FOREIGN PATENT DOCUMENTS

| | | |
|---|---|---|
| JP | 3329402 A | 7/2002 |

* cited by examiner

⟨ POWER GENERATION CHARACTERISTICS
POWER GENERATION TARGET VOLTAGE 14.0V ⟩

⟨ POWER GENERATION CHARACTERISTICS
POWER GENERATION TARGET VOLTAGE 14.0V ⟩ ifcMAX>ifcMAX2. Such a setting allows switching between AVR and ACR operations with a difference hysteresis between the first and second current limit values ifcMAX and ifcMAX2.

POWER GENERATION CONTROLLER OF VEHICLE POWER GENERATOR

BACKGROUND OF THE INVENTION

1. Field of the Invention

The present invention relates to a power generation controller of a vehicle power generator and, more specifically, to a power generation controller provided in a wound-field type synchronous generator for use with a vehicle with which a favorable voltage controllability is implemented when control is exercised over a to-be-generated voltage through ON/OFF switching of voltage application to a field winding.

2. Description of the Related Art

An exemplary conventional controller of a vehicle power generator is found in Japanese Patent No. 3329402 (referred to as Patent Document 1), which is shown in FIG. 9.

With such a controller, power generation control is exercised through pulse width modulation with ON/OFF switching that is taken place for voltage application to a field winding. For such power generation control, the ON/OFF switching is digitally timed by a microcomputer.

In FIG. 9, a generator 1 includes an armature winding 21, and a field winding 22. A microcomputer 30 includes a processor 301, ROM 302, RAM 303, a pulse width modulation (PWM) timer 304, an analog-digital (A/D) converter 305, a timer 306, and others.

In the generator 1, a rotor part is connected to a power source that is not shown and exemplified by internal combustion engine directly or indirectly via a belt or others. When the rotor part rotates, alternating current (AC) voltage induction responsively occurs to the armature winding 21, and the AC voltage is converted into direct current (DC) voltage by a rectifier 2.

The rectifier 2 is connected with an electrical load 5 through a battery 3 or a switch 4 for supply of a DC power.

Described next is the operation of a power generation controller 6. That is, first of all, the voltage of the battery 3, and current information equivalent to a field current indicating the voltage level and flowing into the field winding 22 via a shunt resistor 23 are forwarded to the A/D converter 305 via an interface 26. Such an input is subjected to digital value conversion for input to the processor 301. A rotation sensor 24 or a vehicle speed sensor 25 detects a rotation signal. Thus detected rotation signal is forwarded to the processor 301 via the timer 306, indicating the rotation speed of the generator 1.

In the processor 301, a deviation is calculated between the voltage of the battery 3 and a power generation target voltage Vref for first proportional integral (PI). Such an operation is hereinafter referred to as AVR operation. Another deviation is calculated between any detected field current value if and a first current limit value ifcMAX for second proportional integral (PI). Such an operation is hereinafter referred to as ACR operation.

With this being the case, the output result of the AVR operation will be a command value ALPHV for a current flow rate of the field winding, and the output result of the ACR operation will be a command value ALPHI therefor.

The AVR and ACR operations are not executed simultaneously but selectively in consideration of the value relationship among the detected field current value if, the first current limit value ifcMAX, and a second current limit value ifcMAX2, and the level relationship between the battery voltage and the power generation target voltage Vref. Those first and second current limit values are so set as to be To be specific, when the output current coming from the generator 1 is low in level with a low field current, the AVR operation is so executed that a to-be-generated voltage agrees with a target voltage, and the command value ALPHV drives a field switching element 7. On the other hand, when the field current exceeds any predetermined value ifcMAX2, control is so exercised that the maximum value of the field current becomes ifcMAX2 or lower. The ACR operation is then executed so as to prevent generator damage and belt slip, and the command value ALPHI drives the field switching element 7.

The issue here is that such a conventional technology poses a problem of varying power generation controllability depending on the operating point of a generator. In more detail, the to-be-generated power shows a change responsively when the field current changes, and the amount of change varies with the operating point. It means that, against the change of the operation amount of AVR for power generation control=current flow rate of a field winding, power to be generated by the generator varies differently with the operating point. Therefore, the change of battery voltage=input amount of AVR operation will not be uniform.

That is, even if a transient phenomenon of a sudden generator load change at a given operating point is defined by an operation constant of proportional integral with any appropriate response characteristics, it is still uncertain if any other operating points can derive desired response characteristics.

SUMMARY OF THE INVENTION

The invention is proposed to solve the above problems, and an object thereof is to provide a power generation controller of a vehicle power generator capable of improving the responsivity of power generation control with a simple structure, and uniformizing the power generation controllability with whichever operating point.

An aspect of the invention is directed to a power generation controller of a vehicle power generator. The controller is provided with: a rectifier for converting an AC power to be generated by a wound-field type synchronous generator to a DC power for supply to an electrical load and a battery; rotation speed calculation means for calculating a rotation speed of the synchronous generator; a field switching element for performing ON/OFF switching of voltage application to a field winding of the synchronous generator; voltage detection means for sampling a voltage of the battery or a DC-side voltage of the rectifier in synchronization with a periodic sampling signal based on a reference clock; duty range setting means for setting a range (duty range) appropriate to an ON/OFF ratio of the field switching element based on the rotation speed calculated by the rotation speed calculation means; control duty computation means for computing the ON/OFF ratio of the field switching element based on the duty range set by the duty range setting means for agreement between the voltage sampled by the voltage detection means and a power generation target voltage; and field PWM drive means for calculating an ON/OFF timing for the field switching element with a predetermined interval based on the reference clock from the ON/Off ratio computed by the control duty computation means, and generating a field switching signal for driving the field switching element.

What is more, in addition to the power generation controller of the above aspect, control duty correction means is provided for correcting, for output, the setting value of the ON/OFF ratio of the field switching element in accordance with a change of the ON/OFF ratio of the field switching element provided to the field PWM drive means.

According to the invention, successfully provided is a power generation controller of a vehicle power generator capable of improving the responsivity of power generation control with a simple structure, and keeping the power generation controllability favorable and uniform with whichever operating point of the power generator.

What is more, according to the invention, the power generation controller of the vehicle power generator prevents a braking torque from considerably varying due to too much ON/OFF ratio change of a field switching element. Such prevention is applied by setting a change limit to the ON/OFF ratio of the field switching element.

This thus prevents any unnecessary rotation change or hunting of a power source exemplified by internal combustion engine connected to the rotor part. What is more, when the connection to the rotor part is established via a belt, it can prevent belt slip, annoying noise (belt squeaks), and the like.

DETAILED DESCRIPTION OF THE INVENTION

FIRST EMBODIMENT

In the below, by referring to the accompanying drawings, a power generation controller of a vehicle power generator of a first embodiment of the invention is described.

Figure 1:
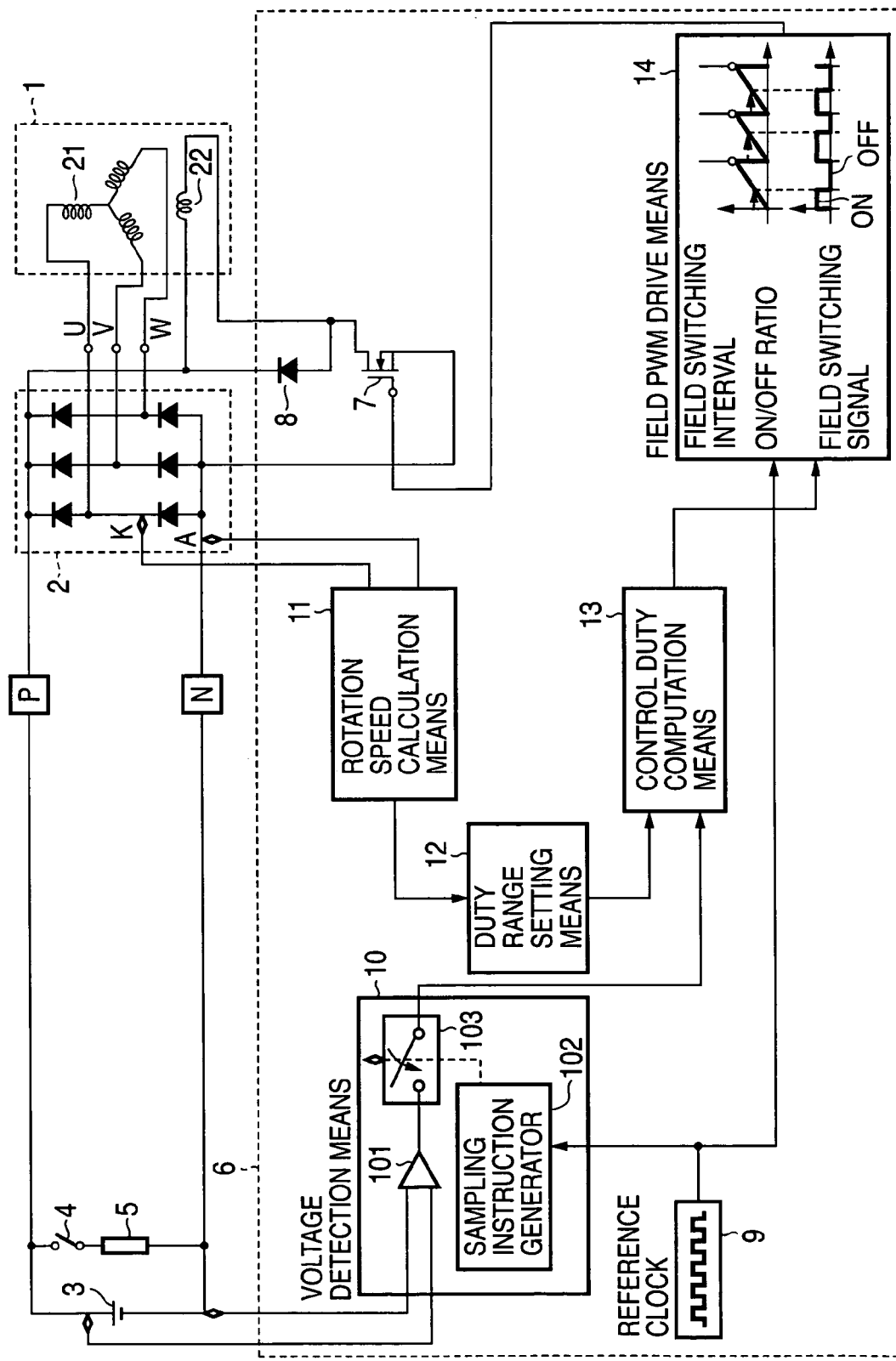
FIG. 1 is a block diagram showing the entire structure of a power generation controller of a vehicle power generator of a first embodiment of the invention.

FIG. 1 is a block diagram showing the entire structure of the power generation controller of the vehicle power generator of the first embodiment.

In FIG. 1, the reference numeral 1 denotes the wound-field type synchronous generator, 2 denotes the rectifier, 3 denotes the battery, 4 denotes the switch, 5 denotes the electrical load, 6 denotes the power generation controller, 7 denotes a field switching element, and 8 denotes a flywheel diode.

The wound-field type synchronous generator 1 (hereinafter, also referred to simply as synchronous generator) includes the armature winding 21, the field winding 22, and others. In the synchronous generator 1, the rotor part is connected to a power source that is not shown and exemplified by internal combustion engine directly or indirectly via a belt or others. When the rotor part rotates, AC voltage induction responsively occurs to the armature winding 21, and the AC voltage is converted into DC voltage by the rectifier 2.

The rectifier 2 is connected with the electrical load 5 through the battery 3 or the switch 4 for supply of a DC power. At this time, the DC voltage as a conversion result in the rectifier 2 changes in level depending on the balance between the to-be-generated power of the synchronous generator 1 and the consumption power of the battery 3 and the electrical load 5. The electrical load 5 includes various electrical devices and equipment exemplified by headlight, blower, wiper, radio, or others, and for some characteristics thereof, variation of DC voltage causes adverse effects.

For example, for a headlight, such a variation causes contrast change and flicker. In consideration thereof, the power generation controller 6 serves to establish a balance between the consumption power and the to-be-generated power for operation at a predetermined DC voltage. For the purpose, an adjustment is made to the AC voltage as a result of voltage induction occurring to the armature winding 21 through control of the field current amount flowing in the field winding 22.

Here, prior to describing the specific operation of the power generation controller 6, described first are the characteristics of to-be-generated power and voltage of the wound-field type synchronous generator, serving as the basic principle of the invention.

Figure 2:
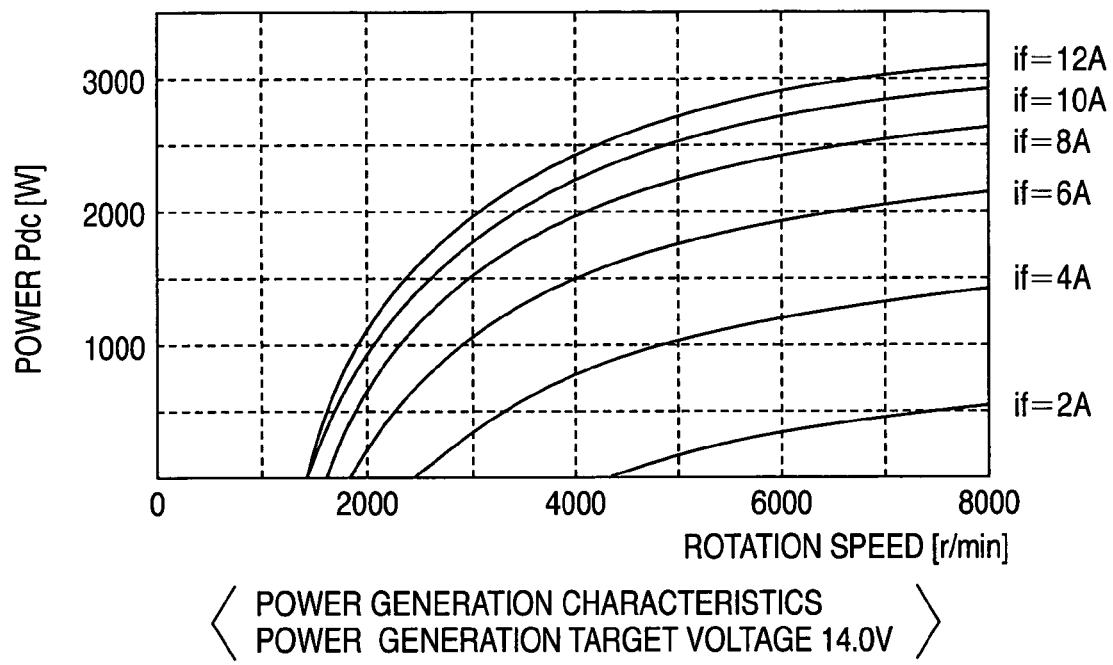
FIG. 2 is a plot between a to-be-generated power and a rotation speed of a wound-field type synchronous generator for use in the first embodiment.

FIG. 2 is a diagram schematically showing, in terms of characteristics, the rotation speed and to-be-generated power with various field currents when the wound-field type synchronous generator operates at any predetermined voltage. FIG. 2 tells that, when the power generation controller 6 establishes a balance between the consumption power and the to-be-generated power for operation at a predetermined DC voltage, if the operation amount of the field current shows no relative change even if the DC voltage varies, the responsivity varies depending on the operating point of the synchronous generator. This is because no power will be generated at the low rotation speed unless the large amount of field current is supplied, and even if the field current is constant, the to-be-generated power shows no linearity with respect to the rotation speed, i.e., the amount of to-be-generated power shows a relative change with respect to the amount of field current depending on the rotation speed of the synchronous generator.

The relationship between the to-be-generated power and the field current is more or less expressed as below. First, the relationship of the field current if and a flux linkage $\Phi f$ of the armature winding 21 is expressed as follows:

$$\Phi_f = L_f i_f \tag{1}$$

In the equation 1, Lf denotes an inductance of the field winding 22. In a case where no connection is established between the synchronous generator and the rectifier 2, the root-mean-square value of a line voltage inducted to the armature winding 21 (no-load induction voltage Vac(o)) is expressed as follows:

$$V_{ac(0)} = \omega \cdot \sqrt{\frac{3}{2}} \cdot \Phi_f \quad (2)$$
$$= \omega \cdot \sqrt{\frac{3}{2}} \cdot L_f \cdot i_f$$

In a case where the synchronous generator is connected to both the rectifier 2 and the battery 3, the DC voltage has a balance with a voltage $V_B$ of the battery 3, and thus a DC voltage $V'_B$ at an output point of the rectifier 2 is expressed as follows:

$$V'_B + a = \frac{3\sqrt{2}}{\pi} \times (V_{ac(0)} - (R_a + \omega L_a) \cdot \sqrt{3} \cdot i_{ac}) \quad (3)$$
$$= \frac{3\sqrt{2}}{\pi} \times \left( \omega \cdot \sqrt{\frac{3}{2}} \cdot L_f \cdot i_f - (R_a + \omega L_a) \cdot \sqrt{3} \cdot i_{ac} \right)$$

In the equation 3, a denotes a voltage reduction in a rectifier diode provided inside of the rectifier 2. Also in the equation 3, Ra denotes a winding resistance of the armature winding 21, La denotes a winding inductance, and iac denotes a root-mean-square value of a line current flowing into the armature winding 21. Here, a DC power $P'_{DC}$ at the output point of the rectifier 2 is expressed in an equation as follows:

$$P'_{DC} = (V'_B + a) \cdot i_{dc} \quad (4)$$
$$= \frac{3\sqrt{2}}{\pi} \times \left( \begin{array}{c} \omega \cdot \sqrt{\frac{3}{2}} \cdot L_f \cdot i_f - \\ (R_a + \omega L_a) \cdot \sqrt{3} \cdot \frac{\pi}{3\sqrt{2}} i_{dc} \end{array} \right) \cdot i_{dc}$$

In view of the above, using the equation 3, with information that the field current idc=0[A] (iac=0[Arms]) when the DC power $P'_{DC}$=0[W], an equation is expressed as follows:

$$<\text{When } P'_{DC} = 0[W]> \quad i_f = \frac{\pi}{3\sqrt{3}} \cdot \frac{V'_B + a}{\omega \cdot L_f} \quad (5)$$

Moreover, with information that the field current idc=α/($V'_{B+a}$) when the DC current $P'_{DC}$=α[W], and through substitution thereof into the equation 4 with some arrangement, an equation is expressed as follows:

$$V'_B + a = \frac{3\sqrt{2}}{\pi} \times \left( \begin{array}{c} \omega \cdot \sqrt{\frac{3}{2}} \cdot L_f \cdot i_f - \\ (R_a + \omega L_a) \cdot \sqrt{3} \cdot \frac{\pi}{3\sqrt{2}} \cdot \frac{\alpha}{V'_B + a} \end{array} \right) \quad (6)$$

Accordingly, from the equation 6, the field current at the time of the DC power $P'_{DC}$=α[W] is expressed as follows:

$$<\text{When } P'_{DC} = \alpha[W]> \quad (7)$$
$$i_f = \frac{\pi}{3\sqrt{3}} \cdot \frac{1}{\omega \cdot L_f} \cdot \left\{ \sqrt{3} \cdot \frac{(V'_B + a) + (R_a + \omega L_a) \cdot}{\frac{\alpha}{V'_B + a}} \right\}$$

Based on the above, the power generation characteristics of the wound-field type synchronous generator shown in FIG. 2 can be expressed by equations.

The equation 5 helps decide the amount of field current serving as a boundary point, between power generation and no power generation, at any predetermined power generation voltage and rotation speed. The equation 7 helps to calculate the amount of field current needed to derive any specific level of power.

Figure 3:
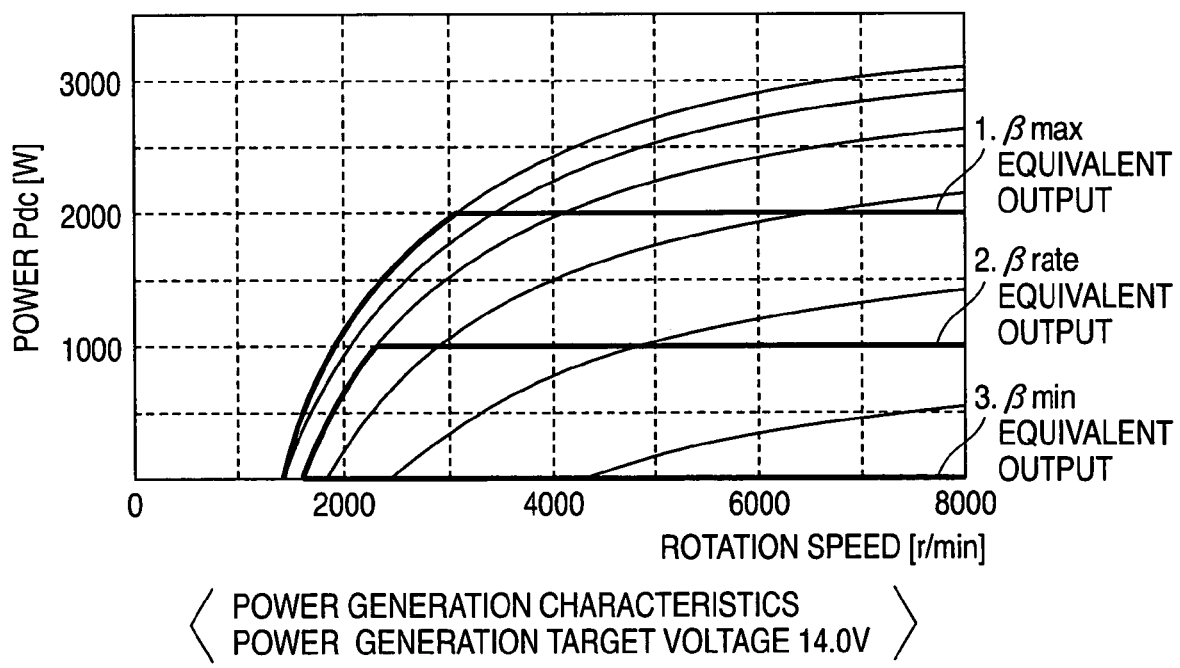
FIG. 3 is a diagram exemplarily showing a field current adjustable range of the wound-field type synchronous generator of the first embodiment.

FIG. 3 shows an exemplary field current adjustable range that is operable by the power generation controller 6. The adjustable range is represented on the power generation characteristics of the wound-field type synchronous generator shown in FIG. 2.

In the drawing, the βmax equivalent output denoted by 1 is a characteristic line that shows a low-rotation-speed range being quite well within the power generation capacity at the to-be-generated power of 2000[W]. The βrate equivalent output denoted by 2 is a characteristic line that shows a low-rotation-speed range being well within the power generation capacity at the to-be-generated power of 1000[W]. The βmin equivalent output denoted by 3 is a characteristic line that shows no power generation.

Herein, the βmax equivalent output means the upper limit of the total consumption power, and may be decided with consideration given to the thermal margin of the processing capacity of the rectifier 2. The βrate equivalent output means the average consumption power, i.e., the rated power, at the time of normal operation. The βmin equivalent output means a boundary point between power generation and no power generation.

Using such characteristic lines and the equation 7, the amount of field current can be determined for various cases at any predetermined voltage and rotation speed. Here, the various cases include when power generation is at the maximum level, at the rated level, and when no power is generated.

As such, the operation of controlling the to-be-generated voltage to be a predetermined value is executed while balancing the to-be-generated power in accordance with the power consumption that varies depending on whether the electrical load 5 operates or not. Such an operation is equivalent to an operation of selecting any optimum amount of field current from the field current adjustable range at the corresponding rotation speed. In this sense, the field current adjustable range may be made corresponding to the variation range of the to-be-generated power so that the power generation control is improved in responsivity. What is more, the power generation controllability can be uniform with whichever operating point.

Based on such a basic principle, the power generation controller 6 of FIG. 1 is described in detail.

The power generation controller 6 is provided with a basic clock 9, voltage detection means 10, rotation speed calculation means 11, duty range setting means 12, control duty computation means 13, and field PWM drive means 14.

First of all, in the rotation speed calculation means 11, the rotation speed of the synchronous generator 1 is calculated when a voltage input is made. The voltage is the one between an anode (A) and a cathode (K) of an rectifier diode inside of the rectifier 2.

Figure 4:
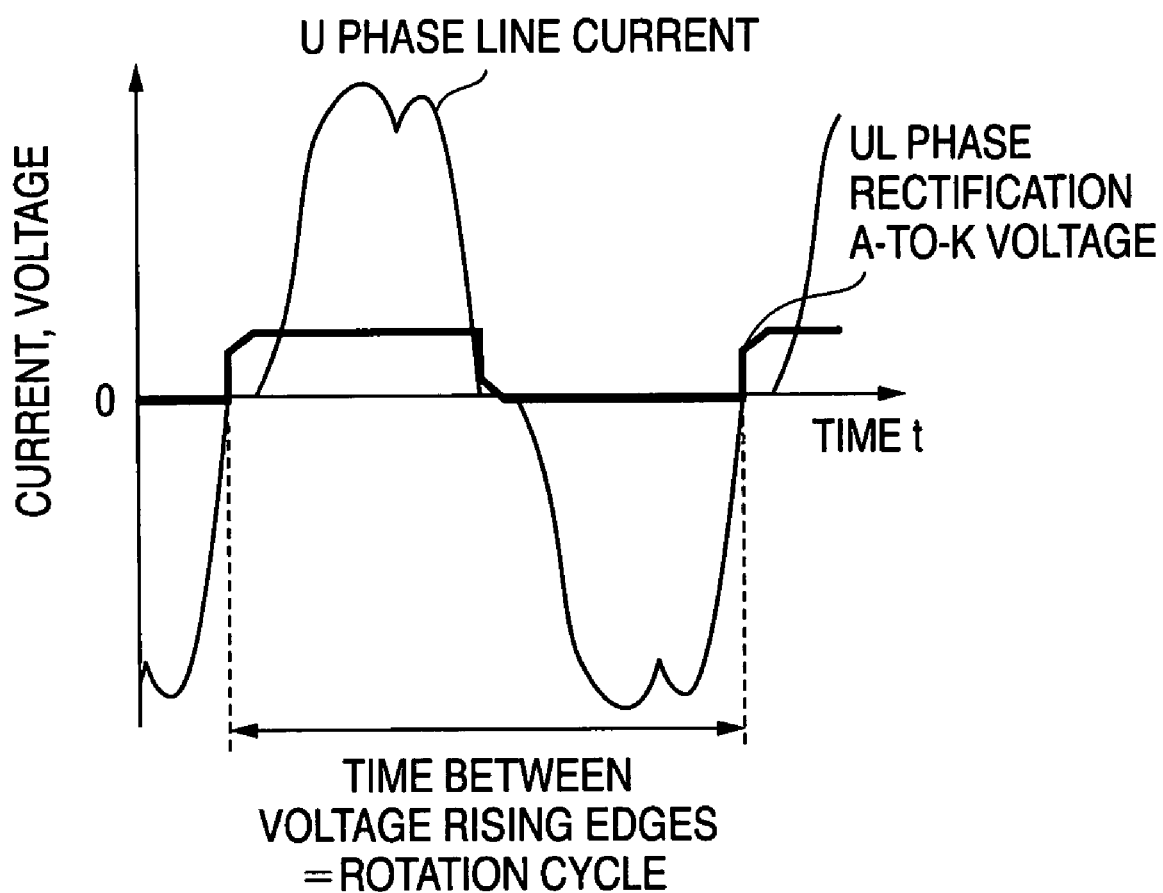
FIG. 4 is a diagram illustrating the principle of rotation speed detection of the first embodiment.

FIG. 4 is a diagram illustrating the operation of calculating the rotation speed, specifically the operation of the rectifier diode on the side of the U-phase N (low orientation). When the rectifier 3 operates for rectification, the rectifier diode in the rectifier 2 is switched between conducting and non-conducting states in synchronization with the AC voltage as a result of induction to the armature winding 21. Moreover, in synchronization with such state switching, the current flows as shown in FIG. 4.

In the conducting state, the potential difference between the anode (A) and cathode (K) will be small in value, i.e., a voltage reduction at the time of PN junction in the forward direction, and in the non-conducting state, the potential difference will be large in value.

As such, the rotation speed can be calculated through a measurement of signal interval, which shows a change synchronously with rotation, e.g., between rising edges of a waveform representing anode (A)-cathode (K) potential differences.

When the rotation speed is input to the duty range setting means 12, based on the equation 7 and the target voltage Vref, the duty range is calculated for output.

Herein, the duty range covers the ON/OFF ratio of a field switching element that is set by the control duty computation means 13 in accordance with a deviation between the target voltage Vref and the actually-generated voltage value. Specifically, the ON/OFF ratio of the field switching element covers the range of βmax-βrate-βmin with the field current corresponding to each of the βmax equivalent output, the βrate equivalent output, and the βmin equivalent output.

The reference clock 9 outputs a clock signal, which is forwarded to both the voltage detection means 10 and the field PWM drive means 14. In the voltage detection means 10, a sampler 103 performs sampling of voltage information of the battery 3 that is provided over an input interface 101. The sampling is performed with a timing of an instruction issued by a sampling instruction issue unit 102. Here, the sampling instruction issue unit 102 issues a sampling instruction at regular intervals based on a clock signal.

The sampled voltage information of the battery 3 is forwarded to the control duty computation means 13 together with the above-described duty range.

Figure 5:
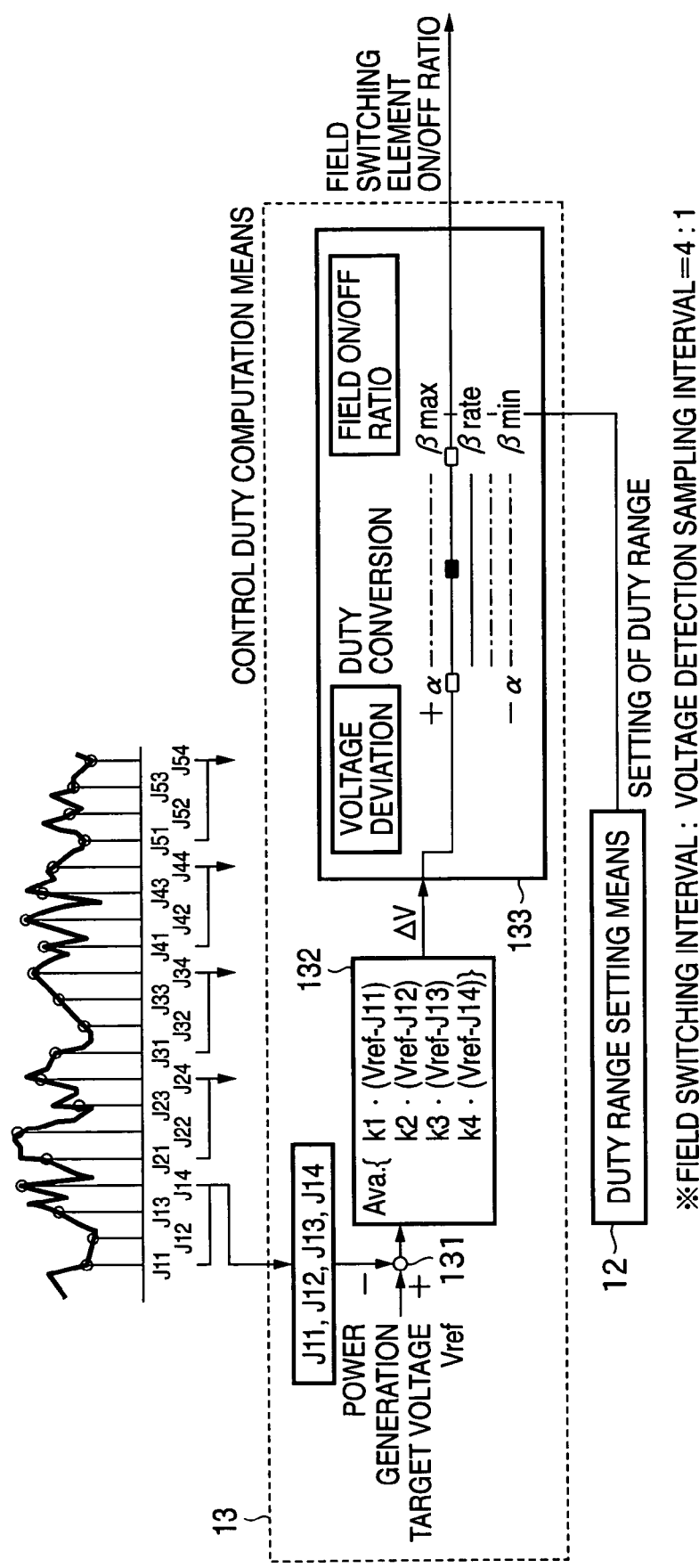
FIG. 5 is a block diagram showing the structure of control duty computation means of the first embodiment.

FIG. 5 is a diagram illustrating the operation of the control duty computation means 13.

The control duty computation means 13 checks the target voltage Vref and the voltage information of the battery 3 for comparison therebetween. Based on the resulting deviation, from the duty range, calculated for output is any corresponding ON/OFF ratio (duty) of the field switching element. The target voltage Vref and the sampled voltage information of the battery 3 are both provided to an addition point 131, and a deviation therebetween is transferred to an average value computation section 132 for storage therein.

The similar process is repeatedly executed for the number of times corresponding to the ratio between the field switching interval of the field switching element 7 and the voltage sampling interval, e.g., four times in FIG. 5. The average value computation section 132 performs multiplication for every information of the voltage derivation in storage so that an average value is calculated. The coefficient is used for weight assignment, with respect to time, to such voltage deviation information, and can reflect the change of the voltage deviation.

Alternatively, for average value computation, a coefficient may be fixed to 1.0 to simply go through a calculation, or a moving average calculation may be performed every time the voltage deviation information comes to reduce the computation load.

Thus computed average value is forwarded to a duty conversion section 133, which calculates any corresponding ON/OFF ratio (duty) of the field switching element from the duty range.

That is, when the voltage deviation is +αV, the ON/OFF ratio of the field switching element will be βmax, and βmin with −αV.

The field PWM drive means 14 is then provided with a clock signal, and the ON/OFF ratio of the field switching element.

Figure 6:
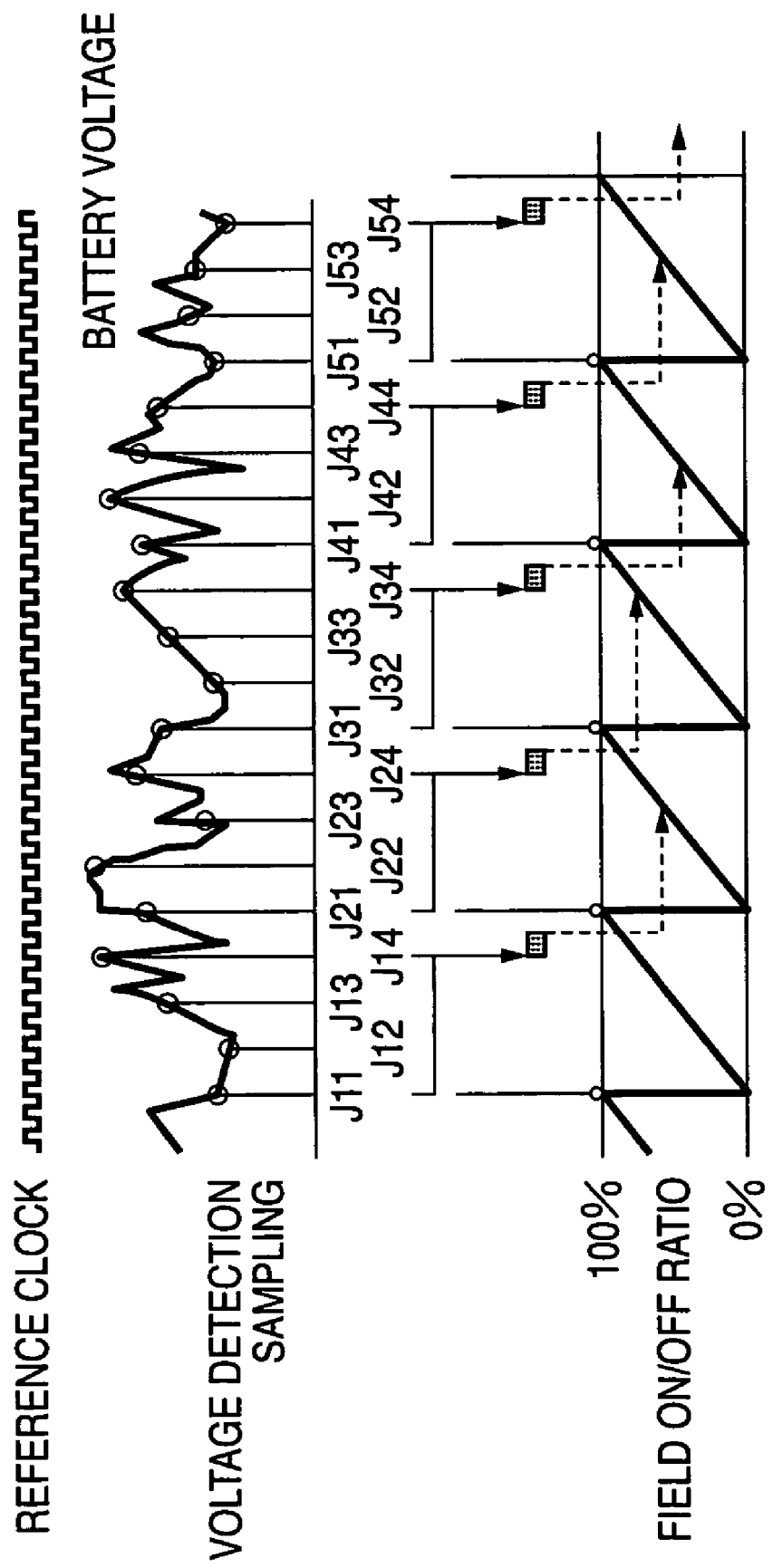
FIG. 6 is a timing diagram of voltage detection sampling and field switching interval of the first embodiment.

FIG. 6 is a diagram illustrating the operation of the field PWM drive means 14.

The field PWM drive means 14 refers to the ON/OFF ratio to calculate ON and OFF timings of the field switching element 7, and then generates a field switching signal for driving the field switching element 7. Such timing calculation is performed based on the premise that the field switching element 7 performs ON/OFF switching with a fixed interval based on a reference clock. Here, a clock signal of the reference clock 9 is used as a basis to derive a timing synchronously for voltage information sampling by the voltage detection means 10, ON/OFF ratio calculation by the control duty computation means 13, and field switching signal generation by the field PWM drive means 14.

The field switching element 7 then performs the ON/OFF switching operation based on a field switching signal coming from the field PWM drive means 14. The low potential side of the field switching element 7 is connected to N (low orientation) side of the rectifier 2, and the high potential side thereof is connected to an end of the field winding 22 and an anode (A) of the flywheel diode 8. The other end of the field winding 22 is connected to P (high orientation) side of the rectifier together with a cathode (K) of the flywheel diode 8. With such a structure, through ON/OFF switching by the field switching element 7, the voltage to be applied to both ends of the field winding 22 shows a change so that the field current can be adjusted in amount.

As described in the foregoing, according to the first embodiment of the invention, the power generation controller of the vehicle power generator can operate in such a manner that a battery voltage agrees with a power generation target voltage with whichever operating point of a synchronous generator with favorable responsivity. Such an operation is achieved by performing sampling of the battery voltage and driving ON/OFF switching of a field switching element at the same time based on a reference clock. Under such circumstances, using the information of deviation between the battery voltage and the target voltage, any appropriate ON/OFF ratio of the field switching element is calculated with the power generation characteristics of a wound-field type synchronous generator considered. Thus calculated ON/OFF ratio is used as a basis to adjust the field current through control of the amount of voltage to be applied to a field winding.

What is more, the ratio of the field switching interval in the field PWM drive means 14 to the voltage sampling interval in the voltage detection means 10 is n:1, where n is an integer. This thus allows to establish synchronization between voltage sampling by the voltage detection means 10 and a timing when the sampling result is reflected as the ON/OFF switching by the field switching element 7. Such synchronization gives assistance to keep the cause-effect temporal relation to be at the predetermined level. Here, the cause is the ON/OFF switching operation of the field switching element 7, and the effect is the detected voltage. Further, the voltage change tendency can be reflected to the control duty computation by weighing a plurality of pieces of information about the voltage sampling results in the field switching interval with n≧2, i.e., the more recent sampling results are to be weighed more.

Still further, the rotation speed calculation means 11 is so structured as to calculate the rotation speed based on a potential difference between the ends of a rectifier element in the rectifier 2. This eliminates the need to provide a rotation detector to calculate the rotation speed for use to define the ON/OFF ratio of the field switching element 7 by a range considered appropriate, i.e., duty range. Here, the rotation detector is the one supposed to be provided to a rotor part of a generator or a rotor body linked thereto, and therefrom, rotation speed information is transferred through an information transfer path. With such a structure, the power generation controller can be reduced both in size and cost.

SECOND EMBODIMENT

Figure 7:
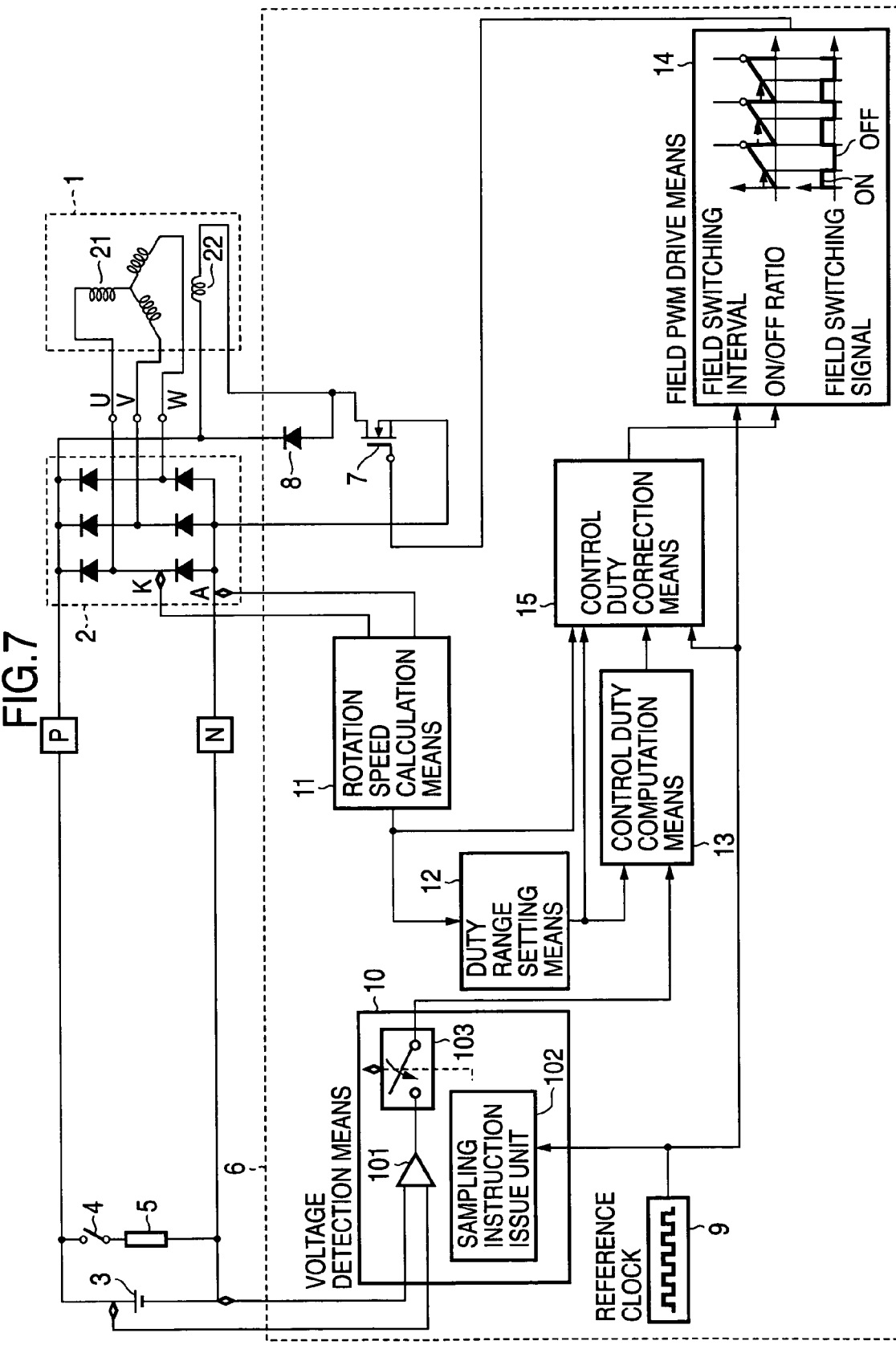
FIG. 7 is a block diagram showing the entire structure of a power generation controller of a vehicle power generator of a second embodiment of the invention.

FIG. 7 is a block diagram showing the entire structure of a power generation controller of a vehicle power generator of a second embodiment. This drawing shows almost the same structure as that of FIG. 1 except control duty correction means 15 that is additionally provided, and components herein operate similarly to those in the first embodiment. Therefore, any components and matters different from those in the first embodiment are mainly described below.

In the above-described first embodiment, the power generation controller 6 so operates that the to-be-generated voltage of the battery 3 agrees with a power generation target voltage by establishing a balance between the consumption power of the electrical load 5 and the to-be-generated power of the wound-field type synchronous generator 1. At this time, the synchronous generator 1 converts the braking (mechanical) energy being an input into electrical energy, and outputs the conversion result as generated power.

Here, the braking energy is the product of a braking torque τ[N·m] and the rotation speed Nm[r/min], and the DC power (to-be-generated power) $P'_{DC}$ is schematically expressed as follows:

$$P'_{DC} \approx \tau_m \cdot N_m \cdot \frac{2\pi}{60} \quad (8)$$

Using the equation 8, assuming that the amount of change Δτm of the braking torque τm shows no change of rotation speed Nm when the to-be-generated power changes ($\Delta P'_{DC}$), the following equation is expressed.

$$\Delta \tau_m \approx \frac{60}{2\pi} \cdot \frac{\Delta P'_{DC}}{N_m} \quad (9)$$

As such, even if the to-be-generated power shows a constant change, the amount of change of the braking torque shows characteristics of varying inversely with the rotation speed. This tells that the braking torque becomes sensitive and thus easily changes against the to-be-generated power as the rotation speed is decreased, causing the braking torque to change to a greater degree even if the to-be-generated power shows a small change.

The rapid change of the braking torque causes unnecessarily rotation change or hunting to the power source, thereby resulting in adverse effects. Here, the power source is exemplified by an internal combustion engine connected to a rotor part of the synchronous generator 1.

In a case where the connection to the rotor part is established via a belt, it can may cause belt slip, annoying noise (belt squeaks), and the like.

In consideration thereof, there requires to take measures to restrictively control the amount of change of the braking torque.

In the invention, the range covering the change of the ON/OFF ratio of the field switching element 7 is made corresponding, as the duty range, to the range of any predetermined power to be generated. Accordingly, restricting the amount of change of the ON/OFF ratio of the field switching element 7 is equivalent to restricting the amount of change of the to-be-generated power. The equation 9 tells that restricting the amount of change of the to-be-generated power is equivalent to restricting the amount of change of the braking torque. That is, by restricting the amount of change of the ON/OFF ratio of the field switching element 7, the braking torque can be controlled in the amount of change.

Based on such a basic principle, the power generation controller 6 of FIG. 7 operates accordingly.

In the drawing, the control duty correction means 15 is provided between the control duty computation means 13 and the field PWM drive means 14. For the purpose of controlling the amount of change of the braking torque, the ON/OFF ratio of the field switching element 7 is controlled in the amount of change for output.

Figure 8:
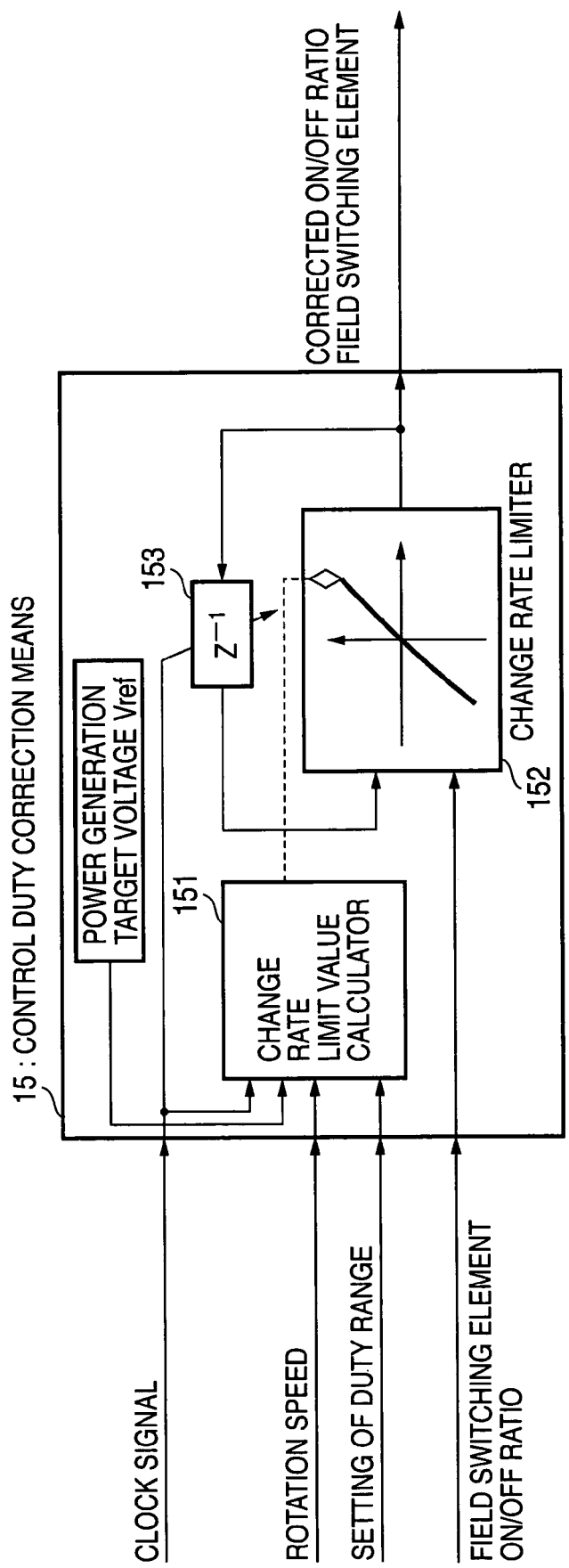
FIG. 8 is a block diagram showing the structure of control duty correction means of the second embodiment.
Figure 9:
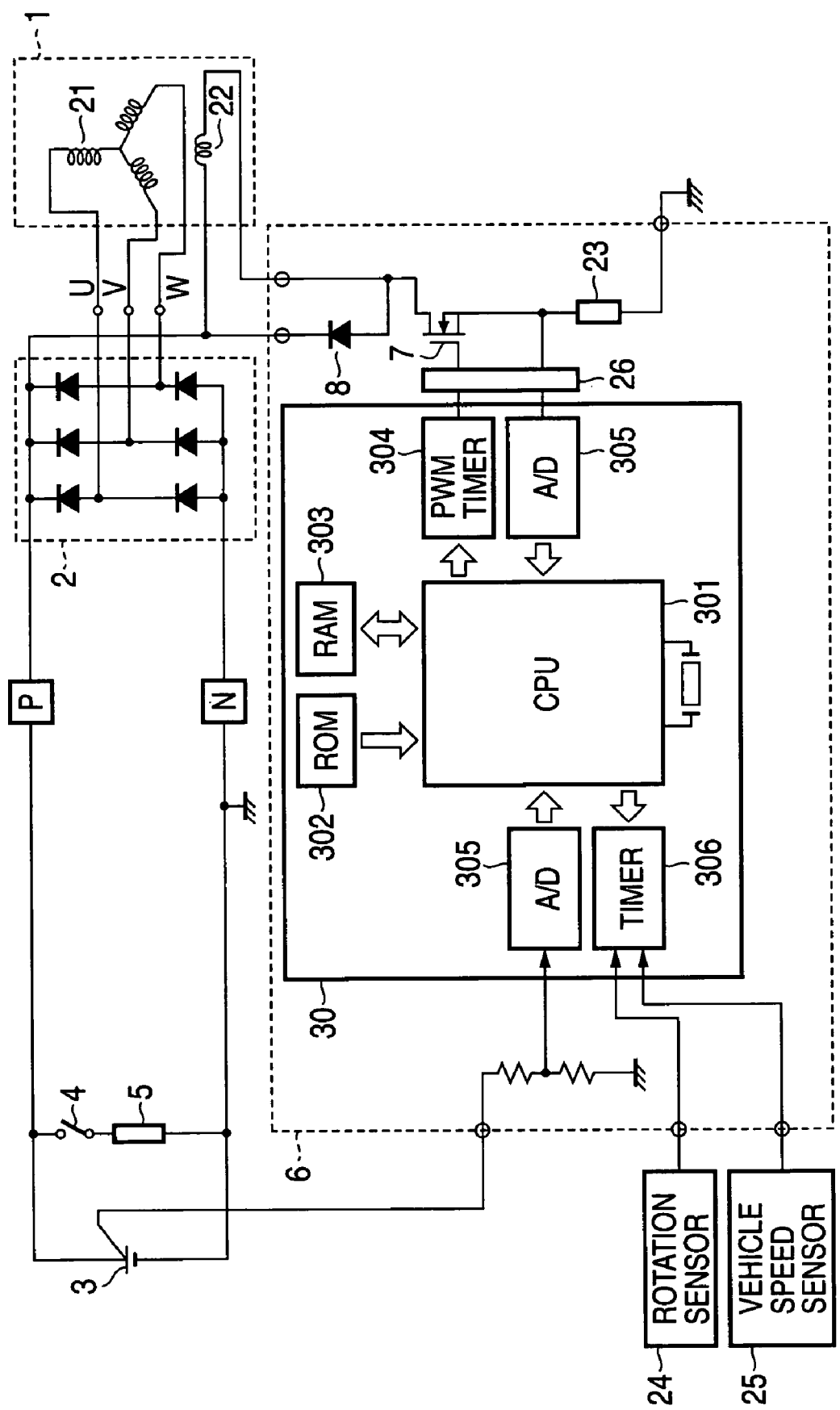
FIG. 9 is a structure diagram of a controller of a vehicle power generator based on a conventional technology.

FIG. 8 is a diagram showing the detailed structure of the control duty correction means 15.

The control duty correction means 15 includes a change rate limit value calculator 151, a change rate limiter 152, and a delay unit 153.

The control duty correction means 15 receives the rotation speed from the rotation speed calculation means 11, the duty range from the duty range setting means 12, the ON/OFF ratio of the field switching element 7 from the control duty computation means 13, and a clock signal from the reference clock 9.

The change rate limit value calculator 151 calculates the limit value of the change rate for the ON/OFF ratio of the field switching element 7 with a time unit of the switching interval of the field switching element 7. Such calculation is performed using thus provided rotation speed, the clock signal, and the duty range, and based on the equation 9.

The delay unit 153 delays the information about the ON/OFF ratio of the field switching element 7, and transfers the delay result to the change rate limiter 152. For this information delay, the switching interval of the field switching element 7 is used as a delay time.

The change rate limiter 152 calculates the change rate for the ON/OFF ratio from the ON/OFF ratio of the field switching element 7 coming from the control duty computation means 13, and another coming from the delay unit 153 in the preceding switching interval. The upper and lower limit values of thus calculated change rate are corrected through control by the limit value of the change rate derived for the ON/OFF ratio. The correction result is then output.

Similarly to the first embodiment, the corrected ON/OFF ratio of the field switching element is forwarded to the field PWM drive means 14, and the field switching element 7 operates for ON/OFF switching so that the field current is adjusted in amount.

As described in the foregoing, according to the power generation controller of the vehicle power generator in the second embodiment, the control duty correction means 15 is additionally provided to the structure of the first embodiment. The control duty correction means 15 corrects, for output, the setting value of the ON/OFF ratio of the field switching element 7 in accordance with the change thereof provided to the field PWM drive means 14. With such a structure, when the amount of change of the ON/OFF ratio of the field switching element 7 exceeds the setting value thereof, by restricting the amount of change to be the setting value, the braking torque is prevented from varying to a greater degree even if the ON/OFF ratio of the field switching element 7 varies to a considerable degree.

This thus prevents any unnecessary rotation change or hunting of a power source exemplified by internal combustion engine connected to the rotor part. What is more, when the connection to the rotor part is established via a belt, it can prevent belt slip, annoying noise (belt squeaks), and the like.

Note here that, although the block structure of FIGS. 1, 5, 7, and 8 is used as a basis for operation description in the above first and second embodiments, the invention is not restricted to such a block structure. Any other structures may be embodied as long as those are based on the power generation characteristics of the wound-field type synchronous generator for use with a vehicle, voltage sampling in synchronization with a reference clock, and switching of a field switching element, those of which are the backbone of the invention.

What is claimed is:

1. A power generation controller of a vehicle power generator, comprising:
    a rectifier for converting an alternating current (AC) power to be generated by a wound-field type synchronous generator to a direct current (DC) power for supply to an electrical load and a battery;
    rotation speed calculation means for calculating a rotation speed of the synchronous generator;
    a field switching element for performing ON/OFF switching of voltage application to a field winding of the synchronous generator;
    voltage detection means for sampling a voltage of the battery or a DC-side voltage of the rectifier in synchronization with a periodic sampling signal based on a reference clock;
    duty range setting means for setting a range (duty range) appropriate to an ON/OFF ratio of the field switching element based on the rotation speed calculated by the rotation speed calculation means;
    control duty computation means for computing the ON/OFF ratio of the field switching element based on the duty range set by the duty range setting means for agreement between the voltage sampled by the voltage detection means and a power generation target voltage; and
    field PWM drive means for calculating an ON/OFF timing for the field switching element with a predetermined interval based on the reference clock from the ON/Off ratio computed by the control duty computation means, and generating a field switching signal for driving the field switching element.

2. The power generation controller of the vehicle power generator according to claim 1, wherein
    the ratio of the field switching interval in the field PWM drive means to the voltage sampling interval in the voltage detection means is n: 1, where n is an integer.

3. The power generation controller of the vehicle power generator according to claim 1, wherein
    the rotation speed calculation means calculates the rotation speed based on a potential difference between ends of a rectifier element in the rectifier.

4. The power generation controller of the vehicle power generator according to claim 1, further comprising
    control duty correction means for correcting the setting value of the ON/OFF ratio of the field switching element in accordance with a change of the ON/OFF ratio of the field switching element provided to the field PWM drive means.

5. The power generation controller of the vehicle power generator according to claim 4, wherein
    the control duty correction means includes limit value calculation means for calculating a limit value of a change rate for the ON/OFF ratio of the field switching element based on the rotation speed calculated by the rotation speed calculation means and the duty range set by the duty range setting means, and change rate calculation means for calculating the change rate of the ON/OFF ratio calculated by the control duty computation means, and upper and lower limit values of the change rate calculated by the change rate calculation means are corrected through control by the limit value of the limit value calculation means.

6. The power generation controller of the vehicle power generator according to claim 1, wherein the amount of field current that serves as a boundary point between power generation and no power generation, at any predetermined power generation voltage and rotation speed is calculated by the following equation:

$$i_f = (\pi/(3\sqrt{3}))((V'_b+a)/(\omega L_f))$$

where $i_f$ is the amount of field current, $V'_b+a$ is the DC voltage at an output of the rectifier, $L_f$ is the inductance of a field winding and $\omega$ is the angular frequency.

7. The power generation controller of the vehicle power generator according to claim 6, wherein the amount of field current needed to derive any specific level of power is calculated by the following equation:

$$i_f = (\pi/(3\sqrt{3}))(1/(\omega L_f))\{(V'_b+a)+(Ra+\omega L_a)(\sqrt{3}(\alpha/(V'_b+a)))\}$$

where $i_f$ represents the amount of field current needed to derive any specific level of power, $\omega$ is the angular frequency, $L_f$ is the inductance of a field winding, $V'_b+a$ is the DC voltage at an output of the rectifier, and $L_a$ is a winding inductance.

* * * * *